(12) United States Patent
Bai et al.

(10) Patent No.: US 10,438,125 B2
(45) Date of Patent: Oct. 8, 2019

(54) VERY SHORT-TERM AIR POLLUTION FORECASTING

(71) Applicant: International Business Machines Corporation, Armonk, NY (US)

(72) Inventors: Xin Xin Bai, Beijing (CN); Jin Dong, Beijing (CN); Xiao Guang Rui, Beijing (CN); Hai Feng Wang, Beijing (CN); Wen Jun Yin, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 896 days.

(21) Appl. No.: 14/939,522

(22) Filed: Nov. 12, 2015

(65) Prior Publication Data

US 2017/0140282 A1    May 18, 2017

(51) Int. Cl.
*G06N 5/04* (2006.01)
*G06N 7/00* (2006.01)
*G06F 17/18* (2006.01)

(52) U.S. Cl.
CPC ............. *G06N 5/047* (2013.01); *G06F 17/18* (2013.01); *G06N 7/00* (2013.01)

(58) Field of Classification Search
None
See application file for complete search history.

(56) References Cited

U.S. PATENT DOCUMENTS 7,542,852 B1   6/2009  Rose et al.
8,190,367 B2   5/2012  Bassa
(Continued)

FOREIGN PATENT DOCUMENTS

CN   201716285 U   1/2011
CN   102103061 A   6/2011
(Continued)

OTHER PUBLICATIONS

Osowski, Stanislaw, and Konrad Garanty. "Forecasting of the daily meteorological pollution using wavelets and support vector machine." Engineering Applications of Artificial Intelligence 20, No. 6 (2007): 745-755 (Year: 2007).*

(Continued)

*Primary Examiner* — Scott A. Waldron
*Assistant Examiner* — Casey R. Garner
(74) *Attorney, Agent, or Firm* — Francis Lammes; Stephen J. Walder; Grant A. Johnson

(57) ABSTRACT

A mechanism is provided for forecasting air pollution. One or more air-pollution monitoring stations correlated to a forecasting point from a plurality of air-pollution monitoring stations are identified. For the one or more air-pollution monitoring stations that correlate to the forecasting point, one or more patterns of the forecasting point, historical patterns of the forecasting point relating to the one or more patterns of the forecasting point, and one or more patterns of the air-pollution monitoring stations that relate to the one or more patterns of the forecasting point are identified. Based on the one or more patterns of the forecasting point, the historical patterns of the forecasting point relating to the one or more patterns of the forecasting point, and the one or more patterns of the air-pollution monitoring stations that relate to the one or more patterns of the forecasting point, a pollution forecast is provided.

15 Claims, 8 Drawing Sheets

(56) References Cited

U.S. PATENT DOCUMENTS

| | | | | |
|---|---|---|---|---|
| 2009/0265037 A1* | 10/2009 | Bassa | ............... | B60H 1/00771 700/276 |
| 2013/0013206 A1* | 1/2013 | Guha | ..................... | G01W 1/10 702/3 |

FOREIGN PATENT DOCUMENTS

| | | | | | |
|---|---|---|---|---|---|
| CN | 103163278 | A | | 6/2013 | |
| CN | 103514366 | A | * | 1/2014 | |
| CN | 103514366 | A | | 1/2014 | |
| CN | 104751242 | A | * | 7/2015 | ............ G06Q 10/04 |
| CN | 104751242 | A | | 7/2015 | |
| KR | 2001-0097331 | A | | 11/2001 | |
| WO | WO 2007/096865 | A2 | | 8/2007 | |

OTHER PUBLICATIONS

Van Leeuwen, Johannes, Dispersion for point sources, Iowa State University, Civil Engineering 524: Air Pollution, Spring Term 2011, accessed at http://home.engineering.iastate.edu/~leeuwen/CE%20524/ Notes/Dispersion_Handout.pdf (Year: 2011).*
Ibarra-Berastegi, Gabriel, Ana Elias, Astrid Barona, Jon Saenz, Agustin Ezcurra, and Javier Diaz de Argandoña. "From diagnosis to prognosis for forecasting air pollution using neural networks: Air pollution monitoring in Bilbao." Environmental Modelling & Software 23, No. 5 (2008): 622-637. (Year: 2008).*
PCT Notification of Transmittal of the International Search Report and the Written Opinion of the International Searching Authority, or the Declaration (PCT/ISA/220), the International Search Report (PCT/ISA/210), and the Written Opinion of the International Searching Authority (PCT/ISA/237), International Application No. PCT/CN2016/098314 dated Nov. 30, 2016, 11 pages.
"Air Quality Forecast Capability", National Oceanic and Atmospheric Administration, U.S. Department of Commerce, http://www.nws.noaa.gov/ost/air_quality/AQF_Fact_Sheet_1220.pdf, publication date unknown, retrieved from the internet Jul. 24, 2015, 3 pages.
"Guidelines for Ambient Air Quality Monitoring", Central Pollution Control Board Ministry of Environment & Forests, http://www.cpcb.nic.in/newitems/7.pdf, Apr. 2003, 164 pages.
"Monitoring Ambient Air Quality for Health Impact Assessment", World Health Organization, WHO Regional Publications, European Series, No. 85, http://www.euro.who.int/_data/assets/pdf_file/0010/119674/E67902.pdf, published 1999, downloaded from the internet Jul. 24, 2015, 216 pages.
"Planning and Implementing a Real-time Air Pollution Monitoring and Outreach Program for Your Community, The AirBeat Project of Roxbury, Massachusetts", U.S. Environmental Protection Agency, Environmental Monitoring for Public Access & Community Tracking (EMPACT), http://airbeat.org/airbeat-tech-xfer-final.pdf, Nov. 2002, 87 pages.
Ip, W.F. et al., "Forecasting daily ambient air pollution based on least squares support vector machines", 2010 IEEE International Conference on Information and Automation (ICIA), Abstract only, Jun. 20-23, 2010, 2 pages.
Sadredin, Seyed, "Report to the Community", San Joaquin Valley Air Pollution Control District, 2012-13 Annual Report, http://www.valleyair.org/2012-13AnnualReport.pdf, Jan. 2013, 27 pages.
Sluiter, R., "Interpolation methods for climate data", Literature review, KNMI, http://www.knmi.nl/bibliotheek/knmipubIR/IR2009-04.pdf, Apr. 2009, 28 pages.
Van Donkelaar, Aaron, "New Map Offers a Global View of Health-Sapping Air Pollution", NASA, http://www.nasa.gov/topics/earth/features/health-sapping.html, Sep. 22, 2010, 3 pages.

* cited by examiner

VERY SHORT-TERM AIR POLLUTION FORECASTING

BACKGROUND

The present application relates generally to an improved data processing apparatus and method and more specifically to mechanisms for very short-term air pollution forecasting.

Air pollution is an introduction of particulates, biological molecules, or other harmful materials into Earth's atmosphere, causing disease, death to humans, damage to other living organisms such as food crops, or the natural or built environment. Air pollution may come from anthropogenic, i.e. an effect or object resulting from human activity, or natural sources. Some of the main anthropogenic sources include: traffic, coal-burning, industry production, and dust emission.

The Earth's atmosphere is a complex natural gaseous system that is essential to support life on planet Earth. Stratospheric ozone depletion due to air pollution has been recognized as a threat to human health as well as to the Earth's ecosystems. Some of the current control measures to control the anthropogenic forms of air pollution include: traffic control, industry production restrictions or limits, and technology improvements.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for forecasting air pollution. The illustrative embodiment identifies one or more air-pollution monitoring stations correlated to a forecasting point from a plurality of air-pollution monitoring stations. For the one or more air-pollution monitoring stations that correlate to the forecasting point, the illustrative embodiment identifies one or more patterns of the forecasting point, historical patterns of the forecasting point relating to the one or more patterns of the forecasting point, and one or more patterns of the air-pollution monitoring stations that relate to the one or more patterns of the forecasting point. The illustrative embodiment provides a pollution forecast based on the one or more patterns of the forecasting point, the historical patterns of the forecasting point relating to the one or more patterns of the forecasting point, and the one or more patterns of the air-pollution monitoring stations that relate to the one or more patterns of the forecasting point.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
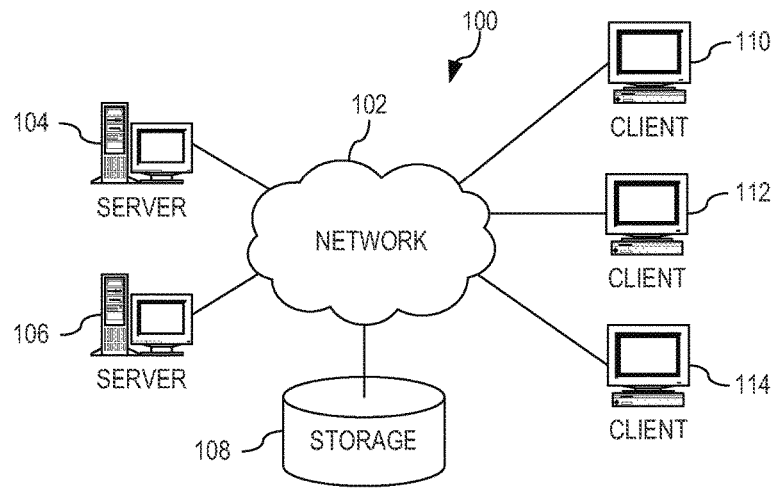
FIG. 1 is an example diagram of a distributed data processing system in which aspects of the illustrative embodiments may be implemented.

As people age, their bodies are less able to compensate for the effects of environmental hazards. Air pollution can aggravate heart disease and stroke, lung diseases such as chronic obstructive pulmonary disease and asthma, and diabetes. Such air pollution leads to increased medication use, more visits to health care providers, admissions to emergency rooms and hospitals, and even death. Ozone and Particulate Matter (PM) (especially smaller, fine particle pollution called PM 2.5) have the greatest potential to affect the health of older adults. Fine particle pollution has been linked to premature death, cardiac arrhythmias and heart attacks, asthma attacks, and the development of chronic bronchitis. Ozone, even at low levels, can exacerbate respiratory diseases.

Therefore, air-pollution forecasting is important to reduce air pollution, improve the quality of life of residents in cities that experience regular poor air quality and high air pollution, and the like. Current air-pollution data, ozone forecasting, information about public health, and environmental effects of air pollution, are utilized to produce day, week, or the like, forecasts and actions that individuals and enterprises may take to protect themselves from or reduce air-pollution. However, air-pollution may change from minute-to-minute based on changes in wind direction, temperature, current pollution levels, or the like. Thus, the illustrative embodiments provide mechanisms for very short-term air pollution forecasting that forecasts the air-pollution levels for the next several hours, for example, 1-6 hours. The mechanisms of the illustrative embodiments leverage intrinsic meteorological and pollution diffusion relations between monitor stations to forecast the air pollution on a hour-by hour basis. Utilizing current air-pollution levels detected by a plurality of air-pollution monitoring stations, the mechanisms leverage meteorological pollution diffusion relations associated with each air-pollution monitoring station to identify correlated air-pollution monitoring stations. Once a set of correlated air-pollution monitoring stations are identified, mechanisms identify air-pollution patterns and more specifically air-pollution events, i.e. a fire causing an increase in air-pollution, an unexpected release of an air-pollution causing chemical by an enterprise, or the like. The mechanisms then provide a very-short term forecast of the air pollution for the identified area and other areas that may be affected by the air-pollution for the next hours by pollution pattern discovery.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
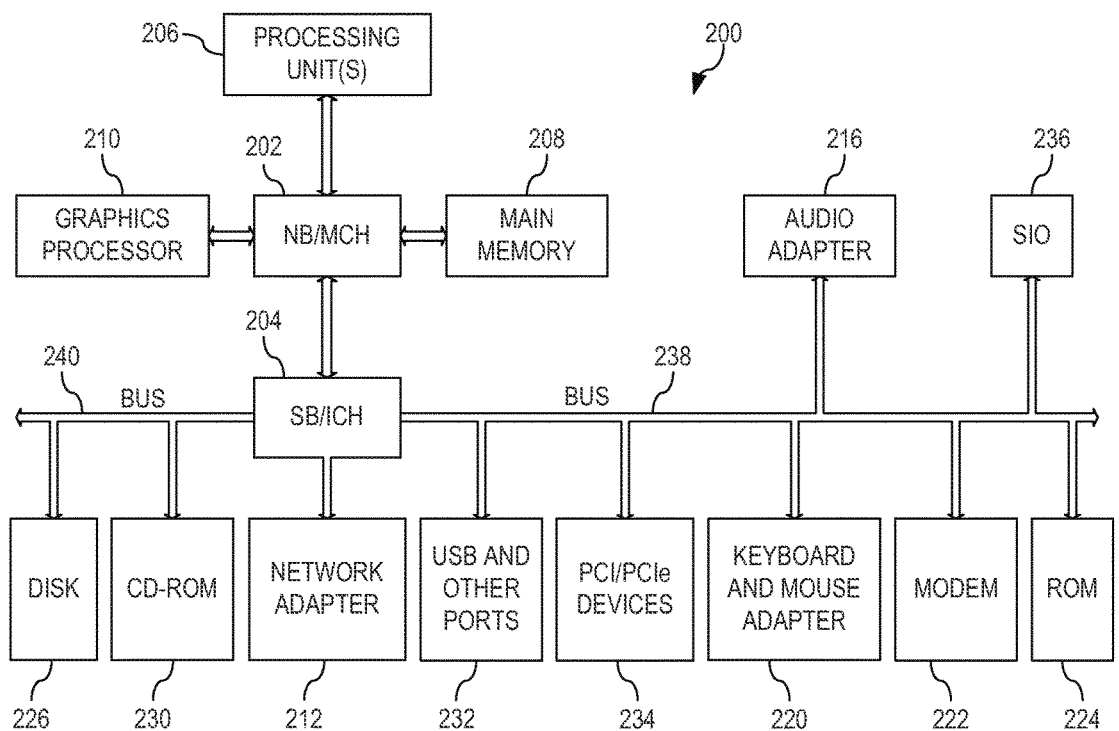
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 12, and 114. Clients 110, 12, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g. server 104, may be specifically configured to implement a very short-term air pollution forecasting mechanism. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates very short-term air pollution forecasting.

As noted above, the mechanisms of the illustrative embodiments utilize specifically configured computing devices, or data processing systems, to perform the operations for very short-term air pollution forecasting. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the very short-term air pollution forecasting.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
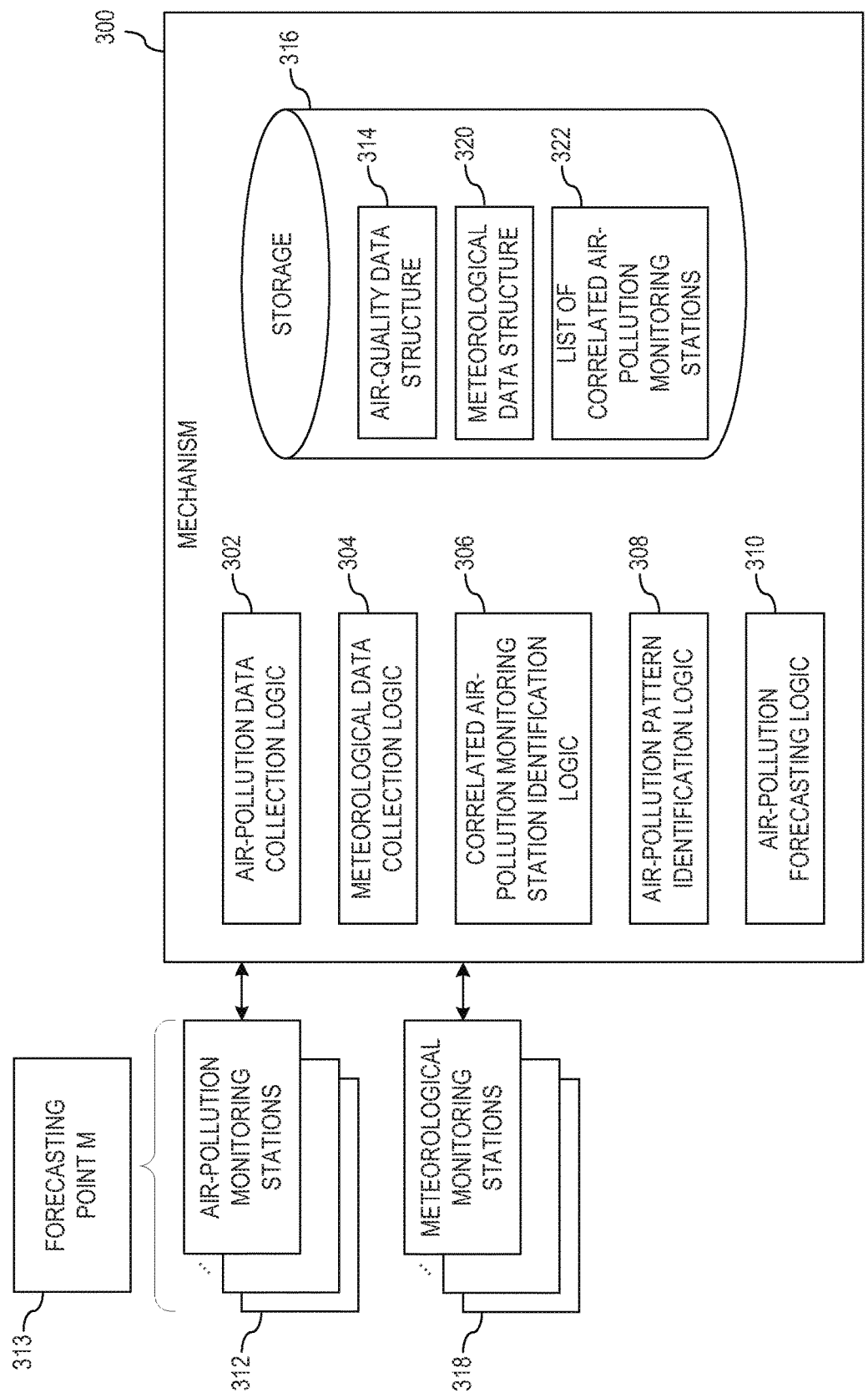
FIG. 3 depicts a functional block diagram of a very short-term air pollution forecasting mechanism in accordance with an illustrative embodiment.

FIG. 3 depicts a functional block diagram of a very short-term air pollution forecasting mechanism in accordance with an illustrative embodiment. Very short-term air pollution forecasting mechanism 300 comprises air-pollution data collection logic 302, meteorological data collection logic 304, correlated air-pollution monitoring station identification logic 306, air-pollution pattern identification logic 308, and air-pollution forecasting logic 310. Air-pollution data collection logic 302 collects air quality data from a plurality of air-pollution monitoring stations 312 and forecasting point M 313. Forecasting point M 313 is a location for which a forecast has been requested, i.e. a selected one of air-pollution monitoring stations 312. This air-quality data includes specific pollutant values of pollution and other substances present in the atmosphere from sources such as facilities, vehicles, and other activities that release pollution into the atmosphere. The pollution and other substances may include carbon monoxide, lead, nitrogen oxides, volatile organic compounds, particulate matter, sulfur dioxide, carbon dioxide, methane, nitrous oxide, fluorinated gases, and the like. Air-pollution data collection logic 302 stores the collected air-quality data on an individual air-pollution monitoring station and time obtained basis in an air-quality data structure 314 in storage 316. Similarly, meteorological data collection logic 304 collects meteorological data from a plurality of meteorological monitoring stations 318 and forecasting point M 313. The meteorological data includes wind speed and direction, air temperature, relative humidity, barometric pressure, precipitation, visibility, dew point, solar radiation, and the like. Meteorological data collection logic 304 stores the collected meteorological data on an individual meteorological monitoring station and time obtained basis in a meteorological data structure 320 in storage 316.

Utilizing the collected data, correlated air-pollution monitoring station identification logic 306 identifies two or more air-pollution monitoring stations of air-pollution monitoring stations 312 that are correlated with a selected forecasting point M 313 using a pollution affective model. In order to identify two or more air-pollution monitoring stations correlated with a selected forecasting point M 313, correlated air-pollution monitoring station identification logic 306 identifies those particular air-pollution monitoring stations $(M_1, M_2, M_3, \ldots, M_n)$ of air-pollution monitoring stations 312 that are within a distance D around forecasting point M 313. For each of the identified air-pollution monitoring stations $(M_1, M_2, M_3, \ldots, M_n)$, correlated air-pollution monitoring station identification logic 306 estimates a degree of influence Di on the forecasting point M 313 at time $T_p$ according to pollutant concentration, wind speed, wind direction, and the like, at time T based on a physical diffusion model. More specifically, for each of the identified air-pollution monitoring stations $(M_1, M_2, M_3, \ldots, M_n)$, correlated air-pollution monitoring station identification logic 306 identifies a diffusion speed s of the pollutant from the air-pollution monitoring station $M_i$ to the forecasting point M 313 utilizing wind speed $w_s$ and wind direction $w_d$. Diffusion speed s is based on the observed wind speed $w_s$ at the air-pollution monitoring station $M_i$ as well as one or more eddy coefficients that are determined by the identified wind speed $w_s$ and air temperature.

Using the calculated diffusion speed s, correlated air-pollution monitoring station identification logic 306 computes an angle Θ between site $M_i$ and M and based on the wind direction at site $M_i$ and computes the velocity of movement v of the pollutant using the diffusion speed s from $M_i$ to M using the following equation:

$$v = s + w_s * \cos \Theta.$$

Correlated air-pollution monitoring station identification logic 306 then identifies the degree of influence $D_i$ of the pollutant from $M_i$ to M using the following formula:

$$D_i = \frac{Q}{2\pi v \sigma_y \sigma_z} \exp\left[-\frac{1}{2}\left(\frac{y^2}{\sigma_y^2 t} + \frac{z^2}{\sigma_z^2 t}\right) - k^2 t\right]$$

where Q is the pollution value of $M_i$, v is the velocity of movement, $\sigma_y$ is the y-axis diffusion parameter (constant value), $\sigma_z$ is the z-axis diffusion parameter (constant value), y is the y-axis distant between $M_i$ and M, z is the z-axis distant between $M_i$ and M, t is the lasting hour (e.g., 1 hour, 2 hours, 3 hours, . . . etc.), and k is the decay factor, which may be a predefined factor.

Utilizing the identified degree of influence $D_i$, correlated air-pollution monitoring station identification logic 306 determines whether the identified degree of influence $D_i$ is greater than a degree of influence threshold DT. If the identified degree of influence Di fails to be greater than a degree of influence threshold DT, then correlated air-pollution monitoring station identification logic 306 continues to the next identified air-pollution monitoring stations $(M_1, M_2, M_3, \ldots, M_n)$. If the identified degree of influence Di is greater than a degree of influence threshold DT, then correlated air-pollution monitoring station identification logic 306 adds the air-pollution monitoring station $M_i$ to a list of correlated air-pollution monitoring stations 322 related to forecasting point M 313.

Figure 4A:
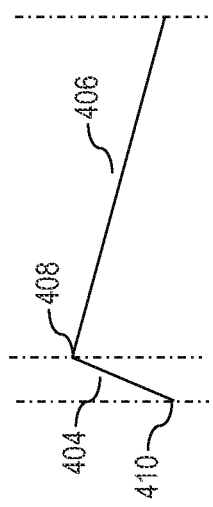
FIG. 4A depicts one example of a pollution curve and extracted shape parameters for a forecasting point M during a selected period of time in accordance with an illustrative embodiment.

With the list of correlated air-pollution monitoring stations 322 identified, air-pollution pattern identification logic 308 analyzes data associated with forecasting point M 313 and the air-pollution monitoring stations in the list of correlated air-pollution monitoring stations 322 to identify one or more patterns. For the forecasting point M 313, air-pollution pattern identification logic 308 identifies the associated meteorological data and pollution data at period of time $T_p$ from the meteorological data structure 320 and the air-quality data structure 314, respectively. For the period of time $T_p$ of forecasting point M 313, air-pollution pattern identification logic 308 detects a current shape pattern of the pollution data and extracts the shape parameters, such as number of rises, number of declines, degree of rises, degree of declines, average amplitude, rise period time length and change range, decline period length and change range, maximum detected value, minimum detected value, or the like. FIG. 4A depicts one example of a pollution curve and extracted shape parameters for a forecasting point M during a selected period of time in accordance with an illustrative embodiment. For the identified pollution curve 402, air-pollution pattern identification logic 308 extracts shape parameters such as rise period time length and change range 404, decline period length and change range 406, maximum detected value 408, and minimum detected value 410.

Figure 4B:
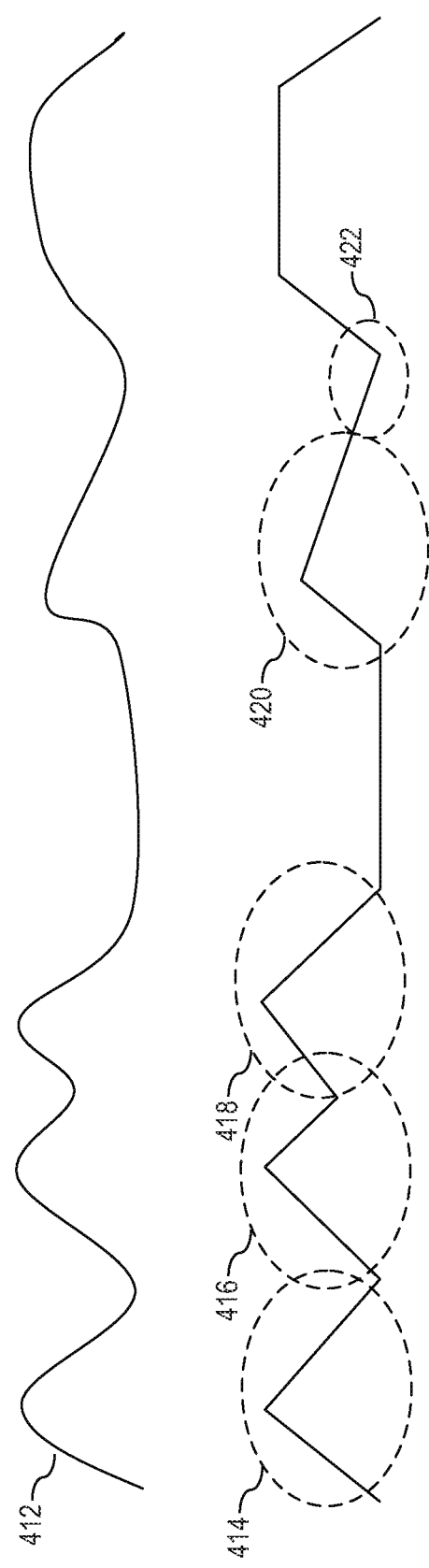
FIG. 4B depicts one example of a historical pollution curve for the forecasting point M in accordance with an illustrative embodiment.

Utilizing the extracted shape parameters, air-pollution pattern identification logic 308 searches the air-quality data structure 314 for historical pollution data associated with forecasting point M 313 that has a similar shaped pattern to that of identified pollution curve 402. FIG. 4B depicts one example of a historical pollution curve for the forecasting point M in accordance with an illustrative embodiment. As is illustrated, air-pollution pattern identification logic 308 extracts the shape parameters from pollution curve 412 that results in four identifiable shape patterns 414, 416, 418, and 420 of a rise followed by a decline. Air-pollution pattern identification logic 308 then calculates a similarity Sm of each of shape patterns 414, 416, 418, and 420 based on, in accordance with the example, rise period time length and change range, decline period length and change range, maximum detected value, minimum detected value to that of rise period time length and change range 404, decline period length and change range 406, maximum detected value 408, minimum detected value 410. That is, for each of extracted shape parameters, i.e. rise period time length and change range, decline period length and change range, maximum detected value, and minimum detected value of shape patterns 414, 416, 418, and 420 and rise period time length and change range 404, decline period length and change range 406, maximum detected value 408, minimum detected value 410 associated with pollution curve 402, air-pollution pattern identification logic 308 determines a difference between the rise period time length and change range, the decline period length and change range, the maximum detected value, and the minimum detected value.

Air-pollution pattern identification logic 308 subtracts the percentage of difference from a perfect match of 100 percent, which in the illustrative embodiment results in a similarity Sm of 55 percent for shape pattern 414, 45 percent for shape pattern 416, 62 percent for shape pattern 418, and 80 percent for shape pattern 420. Air-pollution pattern identification logic 308 then determines whether the computed similarity Sm is greater than a predetermined similarity threshold SmT. For the one or more shape patterns where the similarity Sm is greater than a predetermined similarity threshold SmT, air-pollution pattern identification logic 308 identifies from the historical pollution curve 412 a historical pollution value ph at time $T_p$+h 422, which is used for later forecasting.

Once the forecasting point M 313 has been analyzed, air-pollution pattern identification logic 308 then analyzes each air-pollution monitoring station in the list of correlated air-pollution monitoring stations 322. That is, for each air-pollution monitoring station, air-pollution pattern identification logic 308 identifies the associated meteorological data and pollution data at period of time $T_p$ from the meteorological data structure 320 and the air-quality data structure 314, respectively. For the period of time $T_p$ of each air-pollution monitoring station, air-pollution pattern identification logic 308 utilizes the extracted shape parameters associated with pollution curve 402 to search the air-quality data structure 314 corresponding shape patterns in the data associated with the correlated air-pollution monitoring station. For each identified shape pattern, air-pollution pattern identification logic 308 calculates a similarity Smi based on, in accordance with the example, rise period time length and change range, decline period length and change range, maximum detected value, minimum detected value to that of rise period time length and change range 404, decline period length and change range 406, maximum detected value 408, minimum detected value 410. That is, for each of extracted shape parameters, i.e. rise period time length and change range, decline period length and change range, maximum detected value, and minimum detected value from the correlated air-pollution monitoring station and rise period time length and change range 404, decline period length and change range 406, maximum detected value 408, minimum detected value 410 associated with pollution curve 402, air-pollution pattern identification logic 308 determines a difference between the rise period time length and change range, the decline period length and change range, the maximum detected value, and the minimum detected value. Air-pollution pattern identification logic 308 subtracts the percentage of difference is subtracted from a perfect match of 100 percent and determines whether the computed similarity Smi is greater than a predetermined similarity threshold SmT.

For the one or more shape patterns in the correlated air-pollution monitoring station where the similarity Smi is greater than a predetermined similarity threshold, air-pollution pattern identification logic 308 identifies the air-pollution monitoring station as being associated with an area where the pollution value p may be forecasted to be close to historical pollution value ph at time $T_p$+h. Air-pollution pattern identification logic 308 repeats the process for each air-pollution monitoring station in the list of correlated air-pollution monitoring stations 322. Once all of the air-pollution monitoring stations in the list of correlated air-pollution monitoring stations 322 have been analyzed, air-pollution pattern identification logic 308 outputs the computed similarity Sm of the historical pollution curve that is above the similarity threshold SmT, the similarity Smi of each identified air-pollution monitoring station in the list of correlated air-pollution monitoring stations 322 that is above the similarity threshold SmT, and the pollution value ph at time $T_p$+h.

In order to provide a very short-term air pollution forecast, air-pollution forecasting logic 310 uses the similarity Sm of the historical pollution curve that is above the similarity threshold SmT, which correlates to the detected pollution curve 402 of forecasting point M 313, and the similarity Smi of each identified air-pollution monitoring station in the list of correlated air-pollution monitoring stations 322 to compute a weight $w_j$ for each identified air-pollution monitoring station. In order to calculate a weight $w_j$ for a similar time period Tj according to the similarity Sm at the time period Tj forming Smj and to the similarity Smi at the time period Tj forming Smij, air-pollution forecasting logic 310 uses the following equation:

$$w_j = \frac{Smj * \Pi Smij}{\sum_{j=1}^{n} Smj * \Pi Smij}.$$

Air-pollution forecasting logic 310 then predicts a pollution value $p_{t+h}$ for the correlated air-pollution monitoring stations 322 at time $T_p$+h using the following equation:

$$p_{t+h} = \sum_{j=1}^{n} w_j p_j.$$

Thus, utilizing searches for historical pollution curves that have a similar patterns to the weighted averages of the currently detected pollution values allows air-pollution forecasting logic 310 to forecast the pollution for the next 1 hour, 2 hours, 3 hours, etc. based on the identified similar historical pollution curve(s). For example, if air-pollution forecasting logic 310 identifies a historical pollution curve in the past that is similar to the current detected pollution values (e.g. $ph_1$, $ph_2$, $ph_3$), then the 1 hour forecast is $ph_4$, the 2 hour forecast is $ph_5$, and so on, which allows for matching to any historical pollution pattern and not any one particular pollution pattern.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
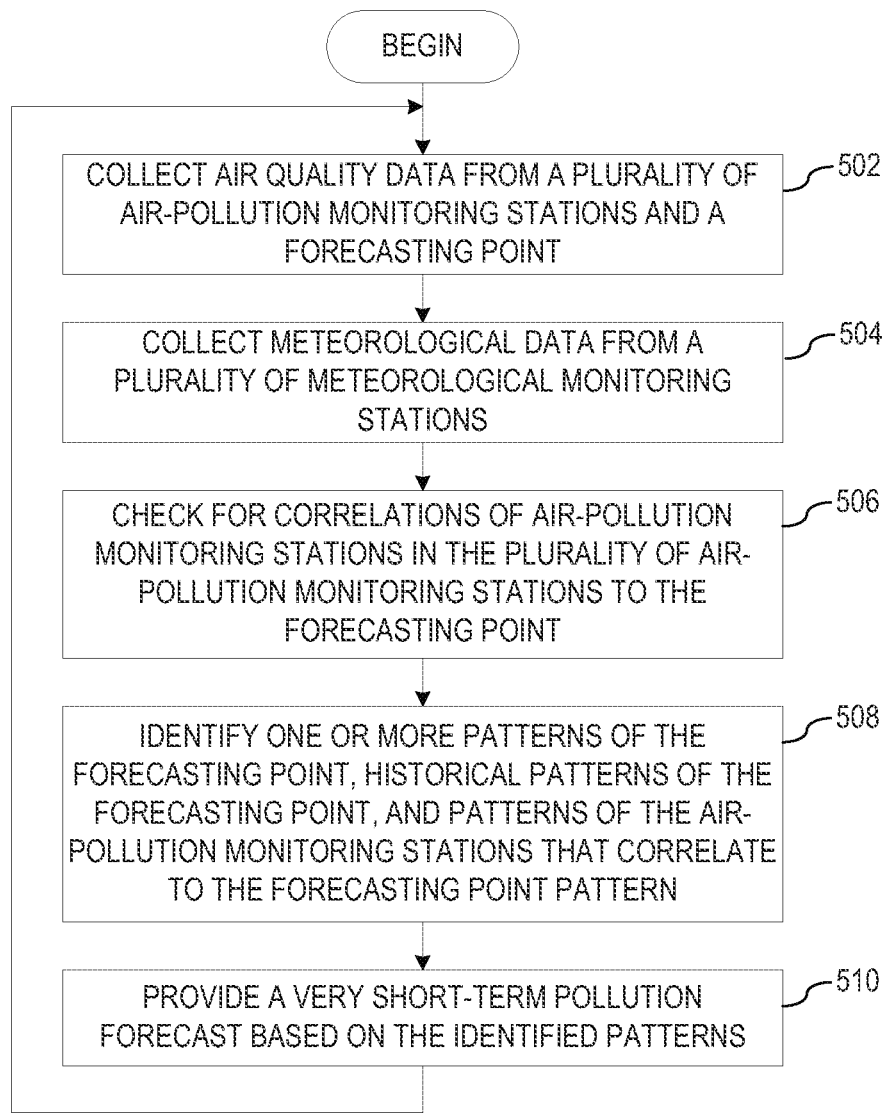
FIG. 5 depicts a high-level flowchart of the operation performed by a very short-term air pollution forecasting mechanism in accordance with an illustrative embodiment.

FIG. 5 depicts a high-level flowchart of the operation performed by a very short-term air pollution forecasting mechanism in accordance with an illustrative embodiment. As the operation begins, the very short-term air pollution forecasting mechanism collects air quality data from a plurality of air-pollution monitoring stations and a forecasting point (step 502). The very short-term air pollution forecasting mechanism also collects meteorological data from a plurality of meteorological monitoring stations (step 504). The very short-term air pollution forecasting mechanism checks for correlations of air-pollution monitoring stations in the plurality of air-pollution monitoring stations to the forecasting point (step 506). For those air-pollution monitoring stations that correlate to the forecasting point, the very short-term air pollution forecasting mechanism identifies one or more patterns of the forecasting point, historical patterns of the forecasting point, and patterns of the air-pollution monitoring stations that relate to the forecasting point pattern (step 508). The very short-term air pollution forecasting mechanism then provides a very short-term pollution forecast based on the identified patterns (step 510), with the process repeating based on a predetermined forecast cycle.

Figure 6:
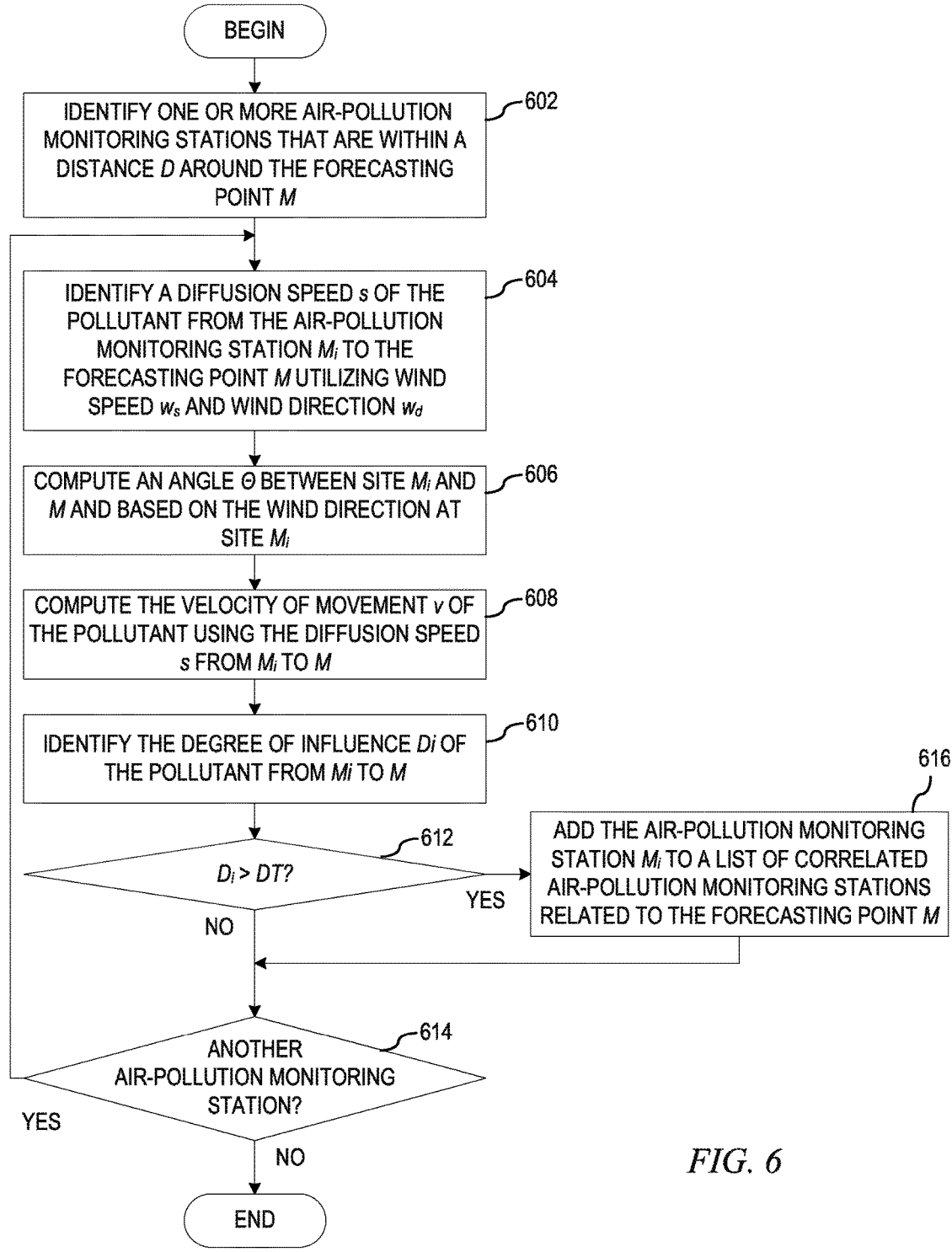
FIG. 6 depicts the operation performed by the very short-term air pollution forecasting mechanism in correlating air-pollution monitoring stations in a plurality of air-pollution monitoring stations to a forecasting point in accordance with an illustrative embodiment.

FIG. 6 depicts the operation performed by the very short-term air pollution forecasting mechanism in correlating air-pollution monitoring stations in a plurality of air-pollution monitoring stations to a forecasting point as described in step 506 of FIG. 5 in accordance with an illustrative embodiment. Utilizing air-quality data on an individual air-pollution monitoring station and time obtained basis and meteorological data on an individual meteorological monitoring station and time obtained basis, the very short-term air pollution forecasting mechanism identifies two or more air-pollution monitoring stations of the plurality of air-pollution monitoring stations that are correlated with each other using a pollution affective model. As the operation begins, the very short-term air pollution forecasting mechanism identifies those particular air-pollution monitoring stations ($M_1, M_2, M_3, \ldots, M_n$) of the plurality of air-pollution monitoring stations that are within a distance D around the forecasting point M (step 602). For each of the identified air-pollution monitoring stations ($M_1, M_2, M_3, \ldots, M_n$), the very short-term air pollution forecasting mechanism estimates a degree of influence Di on the forecasting point M at time T, according to pollutant concentration, wind speed, wind direction, and the like, at time T based on a physical diffusion model. More specifically, for each of the identified air-pollution monitoring stations ($M_1, M_2, M_3, \ldots, M_n$), the very short-term air pollution forecasting mechanism identifies a diffusion speed s of the pollutant from the air-pollution monitoring station $M_i$ to the forecasting point M utilizing wind speed $w_s$ and wind direction $w_d$ (step 604). Diffusion speed s is based on the observed wind speed $w_s$ at the air-pollution monitoring station $M_i$ as well as one or more eddy coefficients that are determined by the identified wind speed $w_s$ and air temperature.

Using the calculated diffusion speed s, the very short-term air pollution forecasting mechanism computes an angle Θ between site $M_i$ and M and based on the wind direction at site $M_i$ (step 606) and computes the velocity of movement v of the pollutant using the diffusion speed s from $M_i$ to M (step 608) using the following equation:

$$v = s + w_s^* \cos \Theta.$$

The very short-term air pollution forecasting mechanism then identifies the degree of influence $D_i$ of the pollutant from $M_i$ to M (step 610) using the following formula:

$$D_i = \frac{Q}{2\pi v \sigma_y \sigma_z} \exp\left[-\frac{1}{2}\left(\frac{y^2}{\sigma_y^2 t} + \frac{z^2}{\sigma_z^2 t}\right) - k^2 t\right]$$

where Q is the pollution value of $M_i$, v is the velocity of movement, $\sigma_y$ is the y-axis diffusion parameter (constant value), $\sigma_z$ is the z-axis diffusion parameter (constant value), y is the y-axis distant between $M_i$ and M, z is the z-axis distant between $M_i$ and M, t is the lasting hour (e.g., 1 hour, 2 hours, 3 hours, . . . etc.), and k is the decay factor, which may be a predefined factor.

Utilizing the identified degree of influence $D_i$, the very short-term air pollution forecasting mechanism determines whether the identified degree of influence $D_i$ is greater than a degree of influence threshold DT (step 612). If at step 612 the identified degree of influence Di fails to be greater than a degree of influence threshold DT, then the very short-term air pollution forecasting mechanism determines whether there is another identified air-pollution monitoring station ($M_1, M_2, M_3, \ldots, M_n$) to analyze (step 614). If at step 614 there is another identified air-pollution monitoring station ($M_1, M_2, M_3, \ldots, M_n$) to analyze, the operation returns to step 604. If at step 612 the identified degree of influence Di is greater than a degree of influence threshold DT, then the very short-term air pollution forecasting mechanism adds the air-pollution monitoring station $M_i$ to a list of correlated air-pollution monitoring stations related to the forecasting point M (step 616), with the operation proceeding to step 614 thereafter. If at step 614 there no other identified air-pollution monitoring stations ($M_1, M_2, M_3, \ldots, M_n$) to analyze, the operation ends.

Figure 7A:
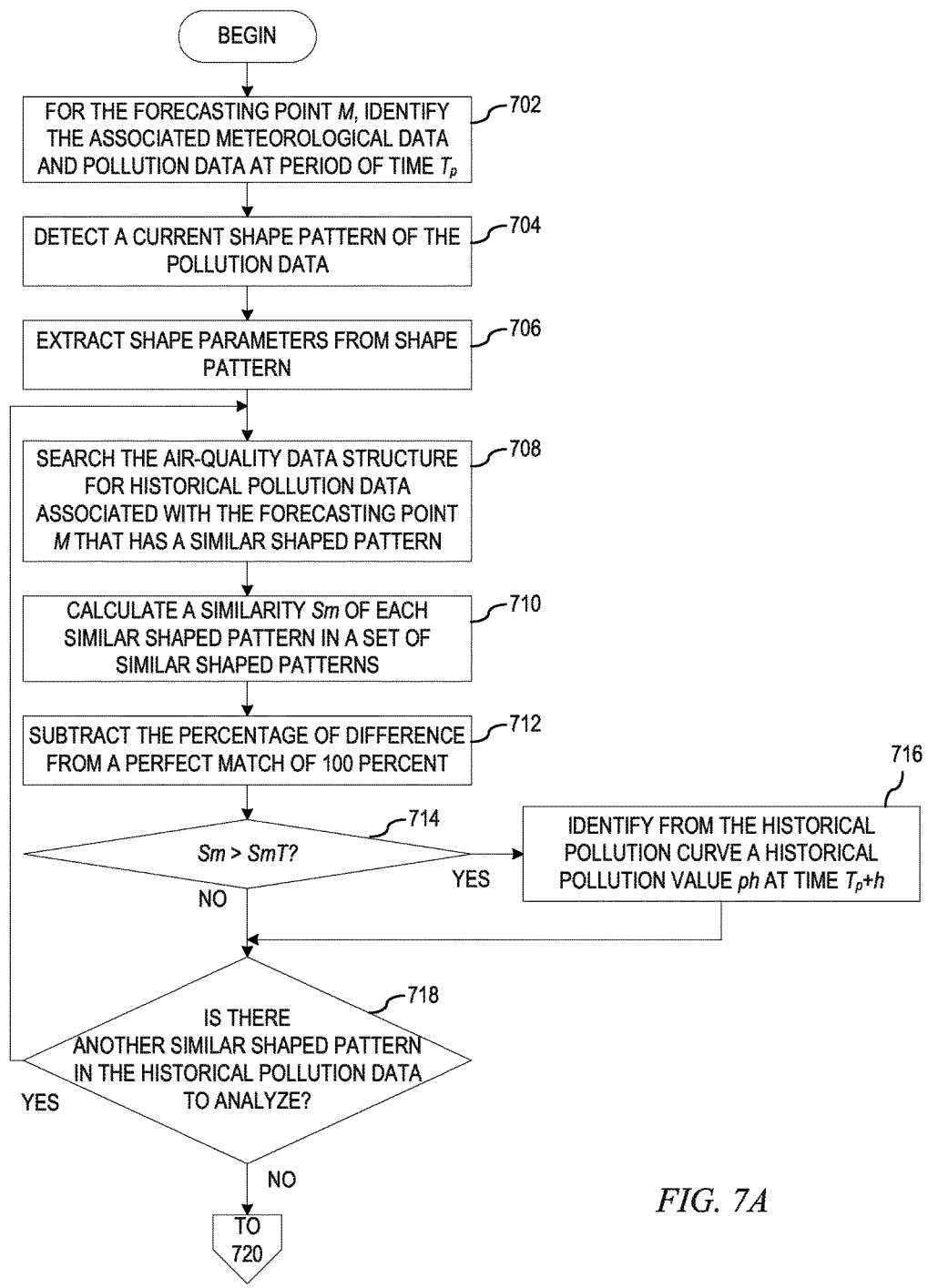
FIGS. 7A and 7B depict the operation performed by the very short-term air pollution forecasting mechanism in identifying one or more patterns in accordance with an illustrative embodiment.
Figure 7B:
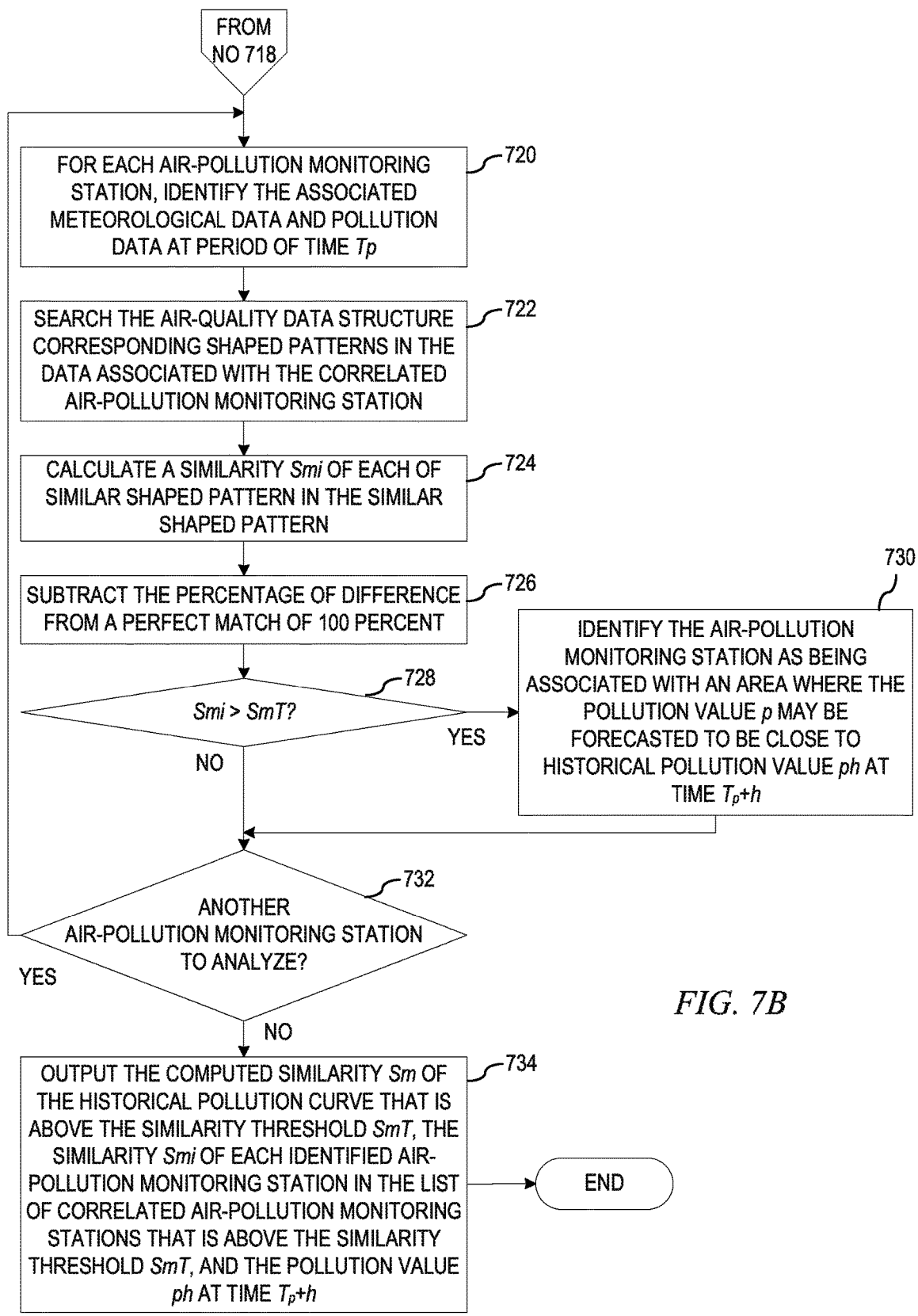

FIGS. 7A and 7B depict the operation performed by the very short-term air pollution forecasting mechanism in identifying one or more patterns as described in step 508 of FIG. 5 in accordance with an illustrative embodiment. As the operation begins, for the forecasting point M, the very short-term air pollution forecasting mechanism identifies the associated meteorological data and pollution data at period of time $T_p$ from the meteorological data structure and the air-quality data structure, respectively (step 702). For the period of time $T_p$ of the forecasting point M, the very short-term air pollution forecasting mechanism detects a current shape pattern of the pollution data (step 704) and extracts shape parameters (step 706), such as number of rises, number of declines, degree of rises, degree of declines, average amplitude, rise period time length and change range, decline period length and change range, maximum detected value, minimum detected value, or the like. Utilizing the extracted shape parameters, the very short-term air pollution forecasting mechanism searches the air-quality data structure for historical pollution data associated with the forecasting point M that has a similar shaped pattern to that of current shape pattern associated with the forecasting point M thereby forming a set of similar shaped patterns (step 708).

The very short-term air pollution forecasting mechanism then calculates a similarity Sm of each similar shaped pattern in a set of similar shaped patterns (step 710). The very short-term air pollution forecasting mechanism subtracts the percentage of difference from a perfect match of 100 percent (step 712) and determines whether the computed similarity Sm is greater than a predetermined similarity threshold SmT (step 714). If at step 714 the computed similarity Sm is greater than a predetermined similarity threshold SmT, the very short-term air pollution forecasting mechanism identifies from the historical pollution curve a historical pollution value ph at time $T_p$+h (step 716), which is used for later forecasting. If at step 714 the computed similarity Sm fails to be greater than a predetermined similarity threshold SmT or from step 716, the very short-term air pollution forecasting mechanism determines whether there is another similar shaped pattern in the historical pollution data to analyze (step 718). If at step 718 there is another similar shaped pattern, then the operation returns to step 708.

If at step 718 there is no other similar shaped pattern, then, for each air-pollution monitoring station, the very short-term air pollution forecasting mechanism identifies the associated meteorological data and pollution data at period of time $T_p$ from the meteorological data structure and the air-quality data structure, respectively (step 720). For the period of time $T_p$ of each air-pollution monitoring station, the very short-term air pollution forecasting mechanism utilizes the extracted shape parameters associated with the current shape pattern associated with the forecasting point M to search the air-quality data structure corresponding shape patterns in the data associated with the correlated air-pollution monitoring station (step 722). For each identified shape pattern, the very short-term air pollution forecasting mechanism calculates a similarity Smi (step 724). The very short-term air pollution forecasting mechanism subtracts the percentage of difference from a perfect match of 100 percent (step 726) and determines whether the computed similarity Smi is greater than a predetermined similarity threshold SmT (step 728).

If at step 728 the similarity Smi is greater than a predetermined similarity threshold SmT, the very short-term air pollution forecasting mechanism identifies the air-pollution monitoring station as being associated with an area where the pollution value p may be forecasted to be close to historical pollution value ph at time $T_p+h$ (step 730). If at step 728 the similarity Smi fails to be greater than a predetermined similarity threshold SmT or from step 730, the very short-term air pollution forecasting mechanism determines whether there is another air-pollution monitoring station to analyze (step 732). If at step 732 there is another air-pollution monitoring station to analyze, then the operation returns to step 720. If at step 732 there is no other air-pollution monitoring station to analyze, the very short-term air pollution forecasting mechanism outputs the computed similarity Sm of the historical pollution curve that is above the similarity threshold SmT, the similarity Smi of each identified air-pollution monitoring station in the list of correlated air-pollution monitoring stations that is above the similarity threshold SmT, and the pollution value ph at time $T_p+h$ (step 734), with the operation ending thereafter.

Figure 8:
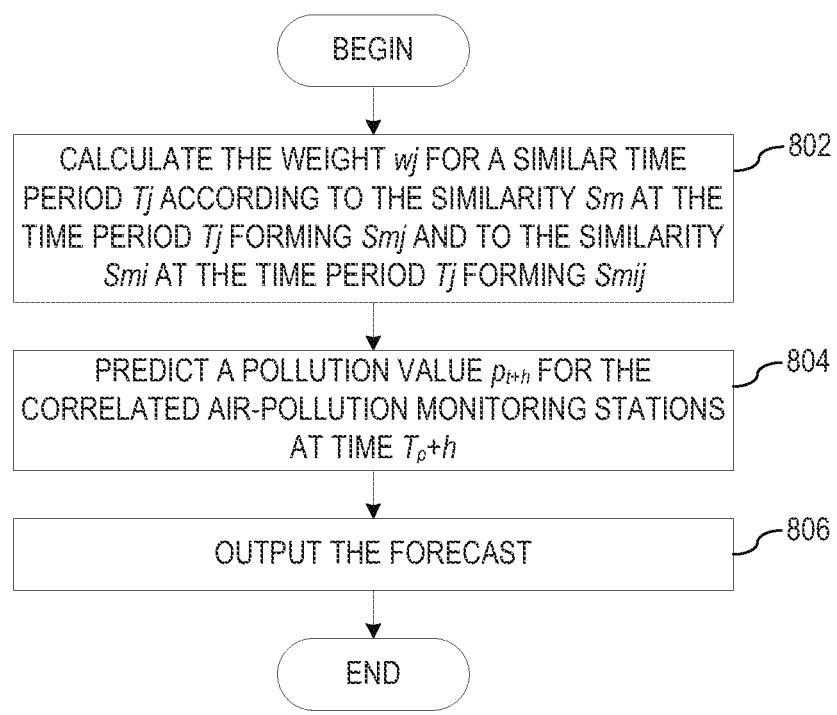
FIG. 8 depicts the operation performed by the very short-term air pollution forecasting mechanism in providing a very short-term air pollution forecast in accordance with an illustrative embodiment.

FIG. 8 depicts the operation performed by the very short-term air pollution forecasting mechanism in providing a very short-term air pollution forecast as described in step 510 of FIG. 5 in accordance with an illustrative embodiment. As the operation begins, the very short-term air pollution forecasting mechanism uses the similarity Sm of the historical pollution curve that is above the similarity threshold SmT, which correlates to the detected pollution curve of the forecasting point M, and the similarity Smi of each identified air-pollution monitoring station in the list of correlated air-pollution monitoring stations to compute a weight $w_j$ for each identified air-pollution monitoring station. The very short-term air pollution forecasting mechanism calculates the weight $w_j$ for a similar time period Tj (step 802) according to the similarity Sm at the time period Tj forming Smj and to the similarity Smi at the time period Tj forming Smij using the following equation:

$$w_j = \frac{Smj * \Pi Smij}{\sum_{j=1}^{n} Smj * \Pi Smij}.$$

The very short-term air pollution forecasting mechanism then predicts a pollution value $p_{t+h}$ for the correlated air-pollution monitoring stations at time $T_p+h$ (step 804) using the following equation:

$$p_{t+h} = \sum_{j=1}^{n} w_j p_j.$$

The very short-term air pollution forecasting mechanism then outputs the forecast to one or more enterprises and/or individuals in order that action is taken to protect themselves from or to reduce air-pollution (step 806), with the operation ending thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for very short-term air pollution forecasting that forecasts the air-pollution levels for the next several hours, for example, 1-6 hours. Using intrinsic meteorological and pollution diffusion relations between monitoring stations to forecast the air pollution on a hour-by hour basis. Utilizing current air-pollution levels detected by a plurality of air-pollution monitoring stations, the mechanisms leverage meteorological pollution diffusion relations associated with each air-pollution monitoring station to identify correlated air-pollution monitoring stations. Once a set of correlated air-pollution monitoring stations are identified, mechanisms identify air-pollution patterns and more specifically air-pollution events, i.e. a fire causing an increase in air-pollution, an unexpected release of an air-pollution causing chemical by an enterprise, or the like. The mechanisms then provide a very-short term forecast of the air pollution for the identified area and other areas that may be affected by the air-pollution for the next hours by pollution pattern discovery.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions that are executed by the processor to cause the processor to be configured to implement an air pollution forecasting mechanism for forecasting air pollution, the method comprising:

identifying, by the air pollution forecasting mechanism, one or more air-pollution monitoring stations correlated to a forecasting point from a plurality of air-pollution monitoring stations, wherein the forecasting point is one of the plurality of air pollution monitoring stations, wherein each of the plurality of air-pollution monitoring stations is located separate from a source of the pollution, and wherein identifying the one or more air-pollution monitoring stations correlated to the forecasting point comprises:

identifying, by the air pollution forecasting mechanism, a set of air-pollution monitoring stations from the plurality of air-pollution monitoring stations that are within a predetermined distance around the forecasting point;

for each of the set of air-pollution monitoring stations, calculating, by the air pollution forecasting mechanism, a diffusion speed s of pollutant from the air-pollution monitoring station $M_i$ to the forecasting point M utilizing wind speed $w_s$, and wind direction $w_d$;

computing, by the air pollution forecasting mechanism, an angle θ between the monitoring station $M_i$ and the forecasting point M based on the wind direction $w_d$ at site $M_i$;

computing, by the air pollution forecasting mechanism, a velocity of movement v of the pollutant using the diffusion speed s from the monitoring station $M_i$ to the forecasting point M using:

$v=s+w_s*\cos \Theta$;

identifying, by the air pollution forecasting mechanism, a degree of influence $D_i$ of the pollutant from the monitoring station $M_i$ to the forecasting point M using:

$$D_i = \frac{Q}{2\pi v \sigma_y \sigma_z} \exp\left[-\frac{1}{2}\left(\frac{y^2}{\sigma_y^2 t} + \frac{z^2}{\sigma_z^2 t}\right) - k^2 t\right]$$

where Q is the pollution value of M, v is the velocity of movement, ay is the y-axis diffusion parameter (constant value), a$\sigma_z$ is the z-axis diffusion parameter (constant value), y is the y-axis distant between M, and M, z is the z-axis distant between MA and M, t is the lasting hour, and k is the decay factor;

determining, by the air pollution forecasting mechanism, whether the identified degree of influence $D_i$, is greater than a degree of influence threshold DT; and responsive to the degree of influence $D_i$ being greater than a degree of influence threshold DT, adding, by the air pollution forecasting mechanism, the air-pollution monitoring station $M_i$ to the one or more air-pollution monitoring stations correlated to the forecasting point M;

for the one or more air-pollution monitoring stations that correlate to the forecasting point, identifying, by the air pollution forecasting mechanism, one or more patterns of the forecasting point, historical patterns of the forecasting point relating to the one or more patterns of the forecasting point, and one or more patterns of the air-pollution monitoring stations that relate to the one or more patterns of the forecasting point; and providing, by the air pollution forecasting mechanism, a pollution forecast, based on the one or more patterns of the forecasting point, the historical patterns of the forecasting point relating to the one or more patterns of the forecasting point, and the one or more patterns of the air-pollution monitoring stations that relate to the one or more patterns of the forecasting point, to one or more enterprises or individuals in order that action is taken to protect themselves from or to reduce air-pollution, wherein providing the pollution forecast based on the one or more patterns of the forecasting point, the historical patterns of the forecasting point relating to the one or more patterns of the forecasting point, and the one or more patterns of the air-pollution monitoring stations that relate to the one or more patterns of the forecasting point comprises:

for each of the one or more air-pollution monitoring stations, calculating, by the air pollution forecasting mechanism, a weight $w_j$ for a time period Tj according to the similarity Sm at the time period Tj forming Smj and to the similarity Smi at the time period Tj forming Smij using:

$$w_j = \frac{Smj * \Pi Smij}{\sum_{j=1}^{n} Smj * \Pi Smij};$$

predicting, by the air pollution forecasting mechanism, a pollution value $P_{t+h}$ for the one or more air-pollution monitoring stations at time $T_p+h$ using equation:

$p_{t+h}=\Sigma_{j=1}^{n} w_j p_j$; and outputting, by the air pollution forecasting mechanism, the pollution forecast to the one or more enterprises or individuals in order that the action is taken to protect themselves from or to reduce air-pollution.

2. The method of claim 1, wherein identifying the one or more air-pollution monitoring stations correlated to the forecasting point utilizes air quality data from a plurality of air-pollution monitoring stations and the forecasting point and meteorological data from a plurality of meteorological monitoring stations.

3. The method of claim 1, wherein identifying the historical patterns of the forecasting point relating to the one or more patterns of the forecasting point comprises:

identifying, by the air pollution forecasting mechanism, for the forecasting point M, associated meteorological data and pollution data for a period of time $T_p$;

for the period of time $T_p$ of the forecasting point M, detecting, by the air pollution forecasting mechanism, the one or more patterns of the forecasting point;

extracting, by the air pollution forecasting mechanism, shape parameters from the one or more patterns of the forecasting point;

searching, by the air pollution forecasting mechanism, for historical pollution data associated with the forecasting point M that has a similar shaped pattern to that of the one or more patterns of the forecasting point thereby forming a set of similar shaped patterns;

calculating, by the air pollution forecasting mechanism, a similarity Sm of each similar shaped pattern in the set of similar shaped patterns;

determining, by the air pollution forecasting mechanism, whether the similarity Sm is greater than a predetermined similarity threshold SmT; and responsive to the similarity Sm being greater than the predetermined similarity threshold SmT, identifying, by the air pollution forecasting mechanism, from the historical pollution data a historical pollution value ph at time $T_p$+h.

4. The method of claim 3, wherein the shape parameters comprise one or more of a number of rises, a number of declines, a degree of rises, a degree of declines, an average amplitude, a rise period time length and change range, a decline period length and change range, a maximum detected value, and a minimum detected value.

5. The method of claim 1, wherein identifying the one or more patterns of the air-pollution monitoring stations that relate to the one or more patterns of the forecasting point comprises:

identifying, by the air pollution forecasting mechanism, for each of the one or more air-pollution monitoring stations that correlate to the forecasting point, associated meteorological data and pollution data for a period of time $T_p$;

for the period of time $T_p$ of the forecasting point M, detecting, by the air pollution forecasting mechanism, the one or more patterns of the forecasting point;

extracting, by the air pollution forecasting mechanism, shape parameters from the one or more patterns of the forecasting point;

searching, by the air pollution forecasting mechanism, for air-pollution monitoring station data of the one or more air-pollution monitoring stations that has a similar shaped pattern to that of the one or more patterns of the forecasting point thereby forming a set of similar shaped patterns;

calculating, by the air pollution forecasting mechanism, a similarity Smi of each similar shaped pattern in the set of similar shaped patterns;

determining, by the air pollution forecasting mechanism, whether the similarity Smi is greater than a predetermined similarity threshold SmT; and responsive to the similarity Smi being greater than a predetermined similarity threshold SmT, identifying, by the air pollution forecasting mechanism, the air-pollution monitoring station as being associated with an area where the pollution value p may be forecasted to be close to a historical pollution value ph at time $T_p$+h.

6. A computer program product comprising a computer readable storage medium having a computer readable program stored therein, wherein the computer readable program, when executed on a computing device, causes the computing device to implement an air pollution forecasting mechanism for forecasting air pollution, and further causing the computing device to:

identify, by the air pollution forecasting mechanism, one or more air-pollution monitoring stations correlated to a forecasting point from a plurality of air-pollution monitoring stations, wherein the forecasting point is one of the plurality of air pollution monitoring stations, wherein each of the plurality of air-pollution monitoring stations is located separate from a source of the pollution, and wherein the computer program product to identify the one or more air-pollution monitoring stations correlated to the forecasting point further causes the computing device to:

identify, by the air pollution forecasting mechanism, a set of air-pollution monitoring stations from the plurality of air-pollution monitoring stations that are within a predetermined distance around the forecasting point;

for each of the set of air-pollution monitoring stations, calculate, by the air pollution forecasting mechanism, a diffusion speed s of pollutant from the air-pollution monitoring station $M_i$ to the forecasting point M utilizing wind speed $w_s$, and wind direction $w_d$;

compute, by the air pollution forecasting mechanism, an angle θ between the monitoring station $M_i$ and the forecasting point M based on the wind direction $w_d$ at site $M_i$;

compute, by the air pollution forecasting mechanism, a velocity of movement v of the pollutant using the diffusion speed s from the monitoring station $M_i$ to the forecasting point M using:

$$v = s + w_s * \cos \Theta;$$

identify, by the air pollution forecasting mechanism, a degree of influence $D_i$ of the pollutant from the monitoring station $M_i$ to the forecasting point M using:

$$D_i = \frac{Q}{2\pi v \sigma_y \sigma_z} \exp\left[-\frac{1}{2}\left(\frac{y^2}{\sigma_y^2 t} + \frac{z^2}{\sigma_z^2 t}\right) - k^2 t\right]$$

where Q is the pollution value of M, v is the velocity of movement, ay is the y-axis diffusion parameter (constant value), $\sigma_z$ is the z-axis diffusion parameter (constant value), y is the y-axis distant between M, and M, z is the z-axis distant between MA and M, t is the lasting hour, and k is the decay factor;

determine, by the air pollution forecasting mechanism, whether the identified degree of influence $D_i$, is greater than a degree of influence threshold DT; and responsive to the degree of influence $D_i$ being greater than a degree of influence threshold DT, add, by the air pollution forecasting mechanism, the air-pollution monitoring station $M_i$ to the one or more air-pollution monitoring stations correlated to the forecasting point M;

for the one or more air-pollution monitoring stations that correlate to the forecasting point, identify, by the air pollution forecasting mechanism, one or more patterns of the forecasting point, historical patterns of the forecasting point relating to the one or more patterns of the forecasting point, and one or more patterns of the air-pollution monitoring stations that relate to the one or more patterns of the forecasting point; and provide, by the air pollution forecasting mechanism, a pollution forecast, based on the one or more patterns of the forecasting point, the historical patterns of the forecasting point relating to the one or more patterns of the forecasting point, and the one or more patterns of the air-pollution monitoring stations that relate to the one or more patterns of the forecasting point, to one or more enterprises or individuals in order that action is taken to protect themselves from or to reduce air-pollution, wherein the computer program product to provide the pollution forecast based on the one or more patterns of the forecasting point, the historical patterns of the forecasting point relating to the one or more patterns of the forecasting point, and the one or more patterns of the air-pollution monitoring stations that relate to the one or more patterns of the forecasting point further causes the computing device to:

for each of the one or more air-pollution monitoring stations, calculate, by the air pollution forecasting mechanism, a weight $w_i$ for a time period Tj according to the similarity Sm at the time period Tj forming Smj and to the similarity Smi at the time period Tj forming Smij using:

$$w_j = \frac{Smj * \Pi Smij}{\sum_{j=1}^{n} Smj * \Pi Smij};$$

predict, by the air pollution forecasting mechanism, a pollution value $P_{t+h}$ for the one or more air-pollution monitoring stations at time $T_p+h$ using equation:

$$p_{t+h} = \sum_{j=1}^{n} w_j p_j; \text{ and}$$

output, by the air pollution forecasting mechanism, the pollution forecast to the one or more enterprises or individuals in order that the action is taken to protect themselves from or to reduce air-pollution.

7. The computer program product of claim 6, wherein the computer program product to identify the one or more air-pollution monitoring stations correlated to the forecasting point further causes the computing device to utilize air quality data from a plurality of air-pollution monitoring stations and the forecasting point and meteorological data from a plurality of meteorological monitoring stations.

8. The computer program product of claim 6, wherein the computer program product to identify the historical patterns of the forecasting point relating to the one or more patterns of the forecasting point further causes the computing device to:

identify, by the air pollution forecasting mechanism, for the forecasting point M, associated meteorological data and pollution data for a period of time $T_p$;

for the period of time $T_p$ of the forecasting point M, detect, by the air pollution forecasting mechanism, the one or more patterns of the forecasting point;

extract shape parameters from the one or more patterns of the forecasting point;

search, by the air pollution forecasting mechanism, for historical pollution data associated with the forecasting point tiff that has a similar shaped pattern to that of the one or more patterns of the forecasting point thereby forming a set of similar shaped patterns;

calculate, by the air pollution forecasting mechanism, a similarity Sm of each similar shaped pattern in the set of similar shaped patterns;

determine, by the air pollution forecasting mechanism, whether the similarity Sm is greater than a predetermined similarity threshold SmT; and responsive to the similarity Sm being greater than the predetermined similarity threshold SmT, identify, by the air pollution forecasting mechanism, from the historical pollution data a historical pollution value ph at time $T_p+h$.

9. The computer program product of claim 8, wherein the shape parameters comprise one or more of a number of rises, a number of declines, a degree of rises, a degree of declines, an average amplitude, a rise period time length and change range, a decline period length and change range, a maximum detected value, and a minimum detected value.

10. The computer program product of claim 6, wherein the computer program product to identify the one or more patterns of the air-pollution monitoring stations that relate to the one or more patterns of the forecasting point further causes the computing device to:

identify, by the air pollution forecasting mechanism, for each of the one or more air-pollution monitoring stations that correlate to the forecasting point, associated meteorological data and pollution data for a period of time $T_p$;

for the period of time $T_p$ of the forecasting point M, detect, by the air pollution forecasting mechanism, the one or more patterns of the forecasting point;

extract, by the air pollution forecasting mechanism, shape parameters from the one or more patterns of the forecasting point;

search, by the air pollution forecasting mechanism, for air-pollution monitoring station data of the one or more air-pollution monitoring stations that has a similar shaped pattern to that of the one or more patterns of the forecasting point thereby forming a set of similar shaped patterns;

calculate, by the air pollution forecasting mechanism, a similarity Smi of each of similar shaped pattern in the set of similar shaped patterns;

determine, by the air pollution forecasting mechanism, whether the similarity Smi is greater than a predetermined similarity threshold SmT; and responsive to the similarity Smi being greater than a predetermined similarity threshold SmT, identify, by the air pollution forecasting mechanism, the air-pollution monitoring station as being associated with an area where the pollution value p may be forecasted to be close to a historical pollution value ph at time $T_p+h$.

11. An apparatus comprising:

a processor; and a memory coupled to the processor, wherein the memory comprises instructions which, when executed by the processor, cause the processor to implement an air pollution forecasting mechanism for forecasting air pollution, and further cause the processor to:

identify, by the air pollution forecasting mechanism, one or more air-pollution monitoring stations correlated to a forecasting point from a plurality of air-pollution monitoring stations, wherein the forecasting point is one of the plurality of air pollution monitoring stations, wherein each of the plurality of air-pollution monitoring stations is located separate from a source of the pollution, and wherein the instructions to identify the one or more air-pollution monitoring stations correlated to the forecasting point further cause the processor to:

identify, by the air pollution forecasting mechanism, a set of air-pollution monitoring stations from the plurality of air-pollution monitoring stations that are within a predetermined distance around the forecasting point;

for each of the set of air-pollution monitoring stations, calculate, by the air pollution forecasting mechanism, a diffusion speed s of pollutant from the air-pollution monitoring station $M_i$ to the forecasting point M utilizing wind speed $w_s$, and wind direction $w_d$;

compute, by the air pollution forecasting mechanism, an angle θ between the monitoring station $M_i$ and the forecasting point M based on the wind direction $w_d$ at site $M_i$;

compute, by the air pollution forecasting mechanism, a velocity of movement v of the pollutant using the diffusion speed s from the monitoring station $M_i$ to the forecasting point M using:

$$v = s + w_s * \cos \Theta;$$

identify, by the air pollution forecasting mechanism, a degree of influence $D_i$ of the pollutant from the monitoring station $M_i$ to the forecasting point M using:

$$D_i = \frac{Q}{2\pi v \sigma_y \sigma_z} \exp\left[-\frac{1}{2}\left(\frac{y^2}{\sigma_y^2 t} + \frac{z^2}{\sigma_z^2 t}\right) - k^2 t\right]$$

where Q is the pollution value of $M_i$, v is the velocity of movement, σy is the y-axis diffusion parameter (constant value), σz is the z-axis diffusion parameter (constant value), y is the y-axis distant between $M_i$ and M, z is the z-axis distant between MA and M, t is the lasting hour, and k is the decay factor;

determine, by the air pollution forecasting mechanism, whether the identified degree of influence $D_i$, is greater than a degree of influence threshold DT; and responsive to the degree of influence $D_i$ being greater than a degree of influence threshold DT, add, by the air pollution forecasting mechanism, the air-pollution monitoring station $M_i$ to the one or more air-pollution monitoring stations correlated to the forecasting point M;

for the one or more air-pollution monitoring stations that correlate to the forecasting point, identify, by the air pollution forecasting mechanism, one or more patterns of the forecasting point, historical patterns of the forecasting point relating to the one or more patterns of the forecasting point, and one or more patterns of the air-pollution monitoring stations that relate to the one or more patterns of the forecasting point; and provide, by the air pollution forecasting mechanism, a pollution forecast, based on the one or more patterns of the forecasting point, the historical patterns of the forecasting point relating to the one or more patterns of the forecasting point, and the one or more patterns of the air-pollution monitoring stations that relate to the one or more patterns of the forecasting point, to one or more enterprises or individuals in order that action is taken to protect themselves from or to reduce air-pollution, wherein the instructions to provide the pollution forecast based on the one or more patterns of the forecasting point, the historical patterns of the forecasting point relating to the one or more patterns of the forecasting point, and the one or more patterns of the air-pollution monitoring stations that relate to the one or more patterns of the forecasting point further cause the processor to:

for each of the one or more air-pollution monitoring stations, calculate, by the air pollution forecasting mechanism, a weight $w_i$ for a time period Tj according to the similarity Sm at the time period Tj forming Smj and to the similarity Smi at the time period Tj forming Smij using:

$$w_j = \frac{Smj * \Pi Smij}{\sum_{j=1}^{n} Smj * \Pi Smij};$$

predict, by the air pollution forecasting mechanism, a pollution value $P_{t+h}$ for the one or more air-pollution monitoring stations at time $T_p$+h using equation:

$$p_{t+h} = \Sigma_{j=1}{}^n w_j p_j; \text{ and}$$

output, by the air pollution forecasting mechanism, the pollution forecast to the one or more enterprises or individuals in order that the action is taken to protect themselves from or to reduce air-pollution.

12. The apparatus of claim 11, wherein the instructions to identify the one or more air-pollution monitoring stations correlated to the forecasting point further cause the processor to utilize air quality data from a plurality of air-pollution monitoring stations and the forecasting point and meteorological data from a plurality of meteorological monitoring stations.

13. The apparatus of claim 11, wherein the instructions to identify the historical patterns of the forecasting point relating to the one or more patterns of the forecasting point further cause the processor to:

identify, by the air pollution forecasting mechanism, for the forecasting point M, associated meteorological data and pollution data for a period of time $T_p$;

for the period of time $T_p$ of the forecasting point M, detect, by the air pollution forecasting mechanism, the one or more patterns of the forecasting point;

extract, by the air pollution forecasting mechanism, shape parameters from the one or more patterns of the forecasting point;

search, by the air pollution forecasting mechanism, for historical pollution data associated with the forecasting point M that has a similar shaped pattern to that of the one or more patterns of the forecasting point thereby forming a set of similar shaped patterns;

calculate, by the air pollution forecasting mechanism, a similarity Sm of each similar shaped pattern in the set of similar shaped patterns;

determine, by the air pollution forecasting mechanism, whether the similarity Sm is greater than a predetermined similarity threshold SmT; and responsive to the similarity Sm being greater than the predetermined similarity threshold SmT, identify, by the air pollution forecasting mechanism, from the historical pollution data a historical pollution value ph at time $T_p$+h.

14. The apparatus of claim 13, wherein the shape parameters comprise one or more of a number of rises, a number of declines, a degree of rises, a degree of declines, an average amplitude, a rise period time length and change range, a decline period length and change range, a maximum detected value, and a minimum detected value.

15. The apparatus of claim 11, wherein the instructions to identify the one or more patterns of the air-pollution monitoring stations that relate to the one or more patterns of the forecasting point further cause the processor to:
   identify, by the air pollution forecasting mechanism, for each of the one or more air-pollution monitoring stations that correlate to the forecasting point, associated meteorological data and pollution data for a period of time $T_p$;
   for the period of time $T_p$ of the forecasting point M, detect, by the air pollution forecasting mechanism, the one or more patterns of the forecasting point;
   extract, by the air pollution forecasting mechanism, shape parameters from the one or more patterns of the forecasting point;
   search, by the air pollution forecasting mechanism, for air-pollution monitoring station data of the one or more air-pollution monitoring stations that has a similar shaped pattern to that of the one or more patterns of the forecasting point thereby forming a set of similar shaped patterns;
   calculate, by the air pollution forecasting mechanism, a similarity Smi of each similar shaped pattern in the set of similar shaped patterns;
   determine, by the air pollution forecasting mechanism, whether the similarity Smi is greater than a predetermined similarity threshold SmT; and
   responsive to the similarity Smi being greater than a predetermined similarity threshold SmT, identify, by the air pollution forecasting mechanism, the air-pollution monitoring station as being associated with an area where the pollution value p may be forecasted to be close to a historical pollution value ph at time $T_p$+h.

* * * * *